United States Patent [19]

Kuehn

[11] 4,165,078
[45] Aug. 21, 1979

[54] FLIP-UP STYLUS PROTECTOR FOR A PHONOGRAPH CARTRIDGE

[75] Inventor: John P. Kuehn, Danbury, Conn.

[73] Assignee: Audio Dynamics Corporation, New Milford, Conn.

[21] Appl. No.: 900,053

[22] Filed: Apr. 26, 1978

[51] Int. Cl.² ............................................ G11B 21/00
[52] U.S. Cl. ...................................... 274/1 R; 274/25; 274/37
[58] Field of Search ................. 274/1 R, 23 R, 37, 38, 274/25; 350/239, 243, 241, 245

[56] References Cited

U.S. PATENT DOCUMENTS

| | | | |
|---|---|---|---|
| 1,249,720 | 12/1917 | Christian | 274/25 |
| 1,411,008 | 3/1922 | Fiske | 350/241 |
| 2,262,503 | 11/1941 | Kierulff | 274/25 |
| 2,413,252 | 12/1946 | Smith | 350/243 |
| 3,538,266 | 11/1970 | Cho | 274/37 |

FOREIGN PATENT DOCUMENTS

| | | | |
|---|---|---|---|
| 232597 | 3/1960 | Australia | 274/23 R |
| 2063625 | 6/1972 | Fed. Rep. of Germany | 274/38 |

Primary Examiner—John W. Shepperd
Attorney, Agent, or Firm—Hopgood, Calimafde, Kalil, Blaustein & Lieberman

[57] ABSTRACT

A phonograph cartridge stylus protector includes a magnifying lens to permit the user to view a magnified image of the stylus tip. The stylus protector is pivotally mounted to the cartridge and may be positioned at a first position out of the way of the stylus, a second position in which the user may obtain one magnified view of the stylus tip while the stylus tip is inserted in a record groove, and a third, lowermost position in which the protector protects the stylus against accidental contact and in which the user may obtain a different magnified view of the stylus tip and the area adjacent the stylus tip.

7 Claims, 3 Drawing Figures

FLIP-UP STYLUS PROTECTOR FOR A PHONOGRAPH CARTRIDGE

This invention relates generally to an improved stylus protector for a phonograph cartridge. The stylus of a phonograph cartridge is an extremely small and delicate object which can easily be damaged by accidental contact. A variety of devices for protecting the stylus are known in the art. One such device has a member, which is movable between a first position up and away from the stylus, and a second position beneath the stylus to protect it from accidental contact.

Since the stylus is small, it is difficult to accurately position the stylus in a record groove, which is important for broadcast purposes so that the start of the record may be accurately timed. Furthermore, the small size of the stylus makes it difficult for the user to determine whether the stylus has become worn, damaged, or dirty. A phonograph record may be irreparably damaged if played with a damaged stylus. Accordingly, it is desirable to be able to permit the user to easily inspect the position and condition of a phonograph stylus.

In accordance with the present invention, a phonograph cartridge is provided with a stylus protector which includes a magnifying lens. The stylus protector is pivotally mounted to the cartridge body and has stops for positioning it at a first position underneath the stylus to protect the stylus from accidental damage and to permit a magnified view of the stylus tip, a second position in which the user also may see a magnified view of the stylus while the stylus engages the grooves of a record, and a third uppermost position above and out of the way of the stylus. A magnified view of the stylus facilitates positioning the stylus in a record groove and also makes it far easier to check the condition of the stylus tip. The stylus protector and lens can advantageously be formed from a unitary moldment.

It is an object of this invention to provide an improved stylus protector for a phonograph cartridge.

It is another object of this invention to provide an improved stylus protector for a phonograph cartridge that includes a magnifying lens.

It is another object of this invention to provide an improved phonograph cartridge stylus protector, including a magnifying lens, that may be used to view the stylus when the stylus is in engagement with the grooves of a record.

It is a further object of this invention to provide a phonograph cartridge which enables the user to inspect the stylus as to its condition and placement.

To the accomplishment of the above and to such further objects of the invention which may hereinafter become apparent, the present invention relates to an improved stylus protector for a phonograph cartridge substantially as defined in the appended claims, and as described in the following specification as considered with the accompanying drawing, in which:

Figure 1:
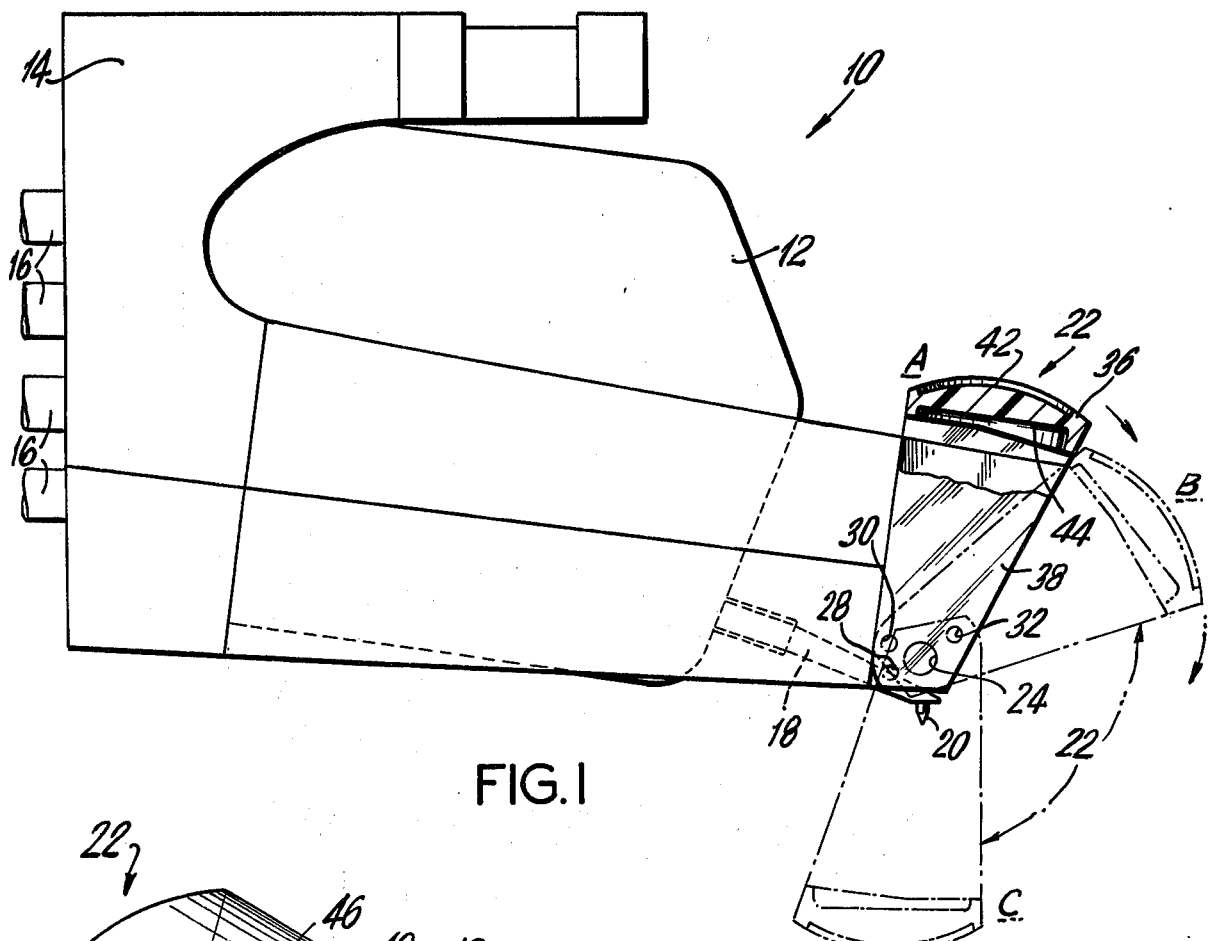
FIG. 1 is a side elevational view of a phonograph cartridge including a stylus protector in accordance with the present invention, the stylus protector being shown partially cut away and in the stylus-viewing position; the protector is also shown, in phantom, in its other operative positions.

A phonograph cartridge generally indicated 10, which may be of any conventional type, such as a magnetic cartridge, includes a body shield 12 and a body 14 for mounting to the headshell of a tone arm (not shown). The electrical connections from the cartridge to the tone arm are made by means of connections to rearwardly extending terminals 16. Cartridge 10, as is also conventional, includes a removable stylus assembly which comprises an arm 18 to which is attached a stylus tip 20.

Figure 2:
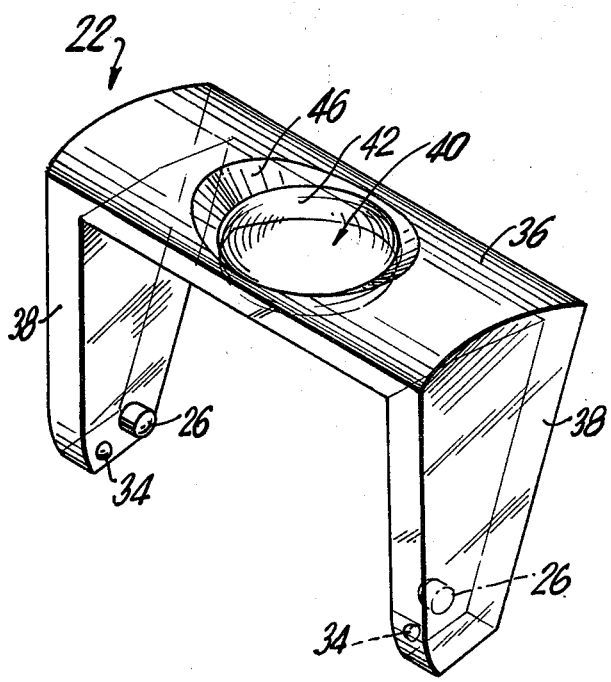
FIG. 2 is a perspective view of the stylus protector.
Figure 3:
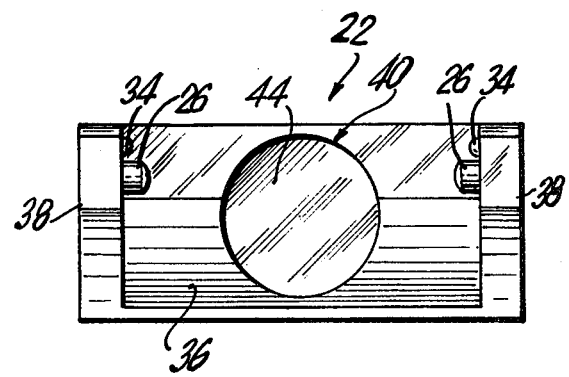
FIG. 3 is a rear view of the stylus protector.

In accordance with the present invention, a stylus protector generally designated 22 is pivotably mounted to the body of cartridge 10. Thus, in the embodiment of the invention shown in FIGS. 1-3, openings 24 are provided at each side of the cartridge body at the lateral forward edges thereof. These openings receive a pair of posts 26, which extend inwardly from stylus protector 22 to pivotally mount the stylus protector to the stylus assembly. The stylus assembly also includes a series of pairs of laterally opposed detents 28, 30 and 32. Stylus protector 22 includes a pair of laterally opposed, inwardly extending projections 34, which selectively and removably engage or fit into one of the pairs of detents 28, 30 and 32, thereby to selectively position the stylus protector at one of three radial positions with respect to the stylus assembly as described in more detail below.

Stylus protector 22 may, as shown, be formed as a unitary moldment from material such as clear acrylic plastic. The stylus protector is generally U-shaped and includes a forward surface 36 and a pair of rearwardly extending tapered arms 38 which carry posts 26 and projections 34. Centrally mounted on forward wall 36 is a magnifying lens 40 which, in the embodiment shown, has a convex front surface 42 and a flat rear surface 44. A bevelled wall 46 leads from the surface of forward wall 36 to the front surface 42 of magnifying lens 40. Other combinations of surfaces providing a magnifying lens may be used in place of the lens illustrated. Lens 40 provides a magnification of power of approximately 3 times; however, other magnifications of this lens may also be provided.

In operation, stylus protector 22 can be selectively positioned at one of three separate positions, as shown in FIG. 1, by removing the projections 34 from one of the pairs of detents 28, 30, or 32 in which the projections are then inserted, and moving the stylus protector to engage or fit the projections 34 into another pair of detents. Thus, in position A, the rest or play position of the stylus protector, projections 34 are in engagement with detents 28 so as to place stylus protector 22 in a position in which it is out of the way of stylus tip 20. In a stylus-viewing position B, at which projections 34 are in engagement with detents 30, stylus tip 20 is positioned within the focal point of lens 40, thereby to allow the user to obtain a magnified, upright image of the stylus tip and enable the user to inspect the condition of the stylus tip to determine whether the stylus tip is worn, so that the worn tip may be replaced before it can cause damage to records in later use. The magnified view provided when stylus protector 22 is in position B also allows the user to readily and accurately position the stylus tip 20 in the first groove of the phonograph record for accurate "cueing", which is particularly important when the cartridge is being used in a broadcast studio or the like. In the stylus-protecting position C, projections 34 are in engagement with detents 32 such that the stylus protector is placed in its lowermost position, thereby to prevent stylus tip 20 from becoming damaged should the tone arm become accidentally dropped. In this position, as in position B, the stylus tip is within the focal length of lens 40 to give the viewer an upright, magnified image of the stylus tip and its surrounding area such that the condition of the stylus tip can be readily determined.

Although the present invention has been described in conjunction with a single preferred embodiment, it is to be understood that modifications and variations may be resorted to without departing from the spirit and scope of the invention, as those skilled in the art will readily understand.

What is claimed is:

1. A phonograph cartridge comprising: a cartridge body; a groove engaging stylus extending from said cartridge body, pivotal mounting means, a protective member pivotally mounted to said cartridge body by said pivotal mounting means; a magnifying lens disposed on said member, at least two detents on one of said member and said body; at least two projections on the other of said member and said body, said detents and said projections being selectively removably engagable to define at least two positions of said member with respect to said body; at said first position of said member said stylus being at the focus of said magnifying lens to thereby provide a magnified image of the stylus; at said second position of said member, said member being disposed beneath said stylus to prevent said stylus from engaging said groove.

2. The phonograph cartridge as claimed in claim 1 further including at least three detents and projections defining a third position of said member, at said third position of said member said member being positioned substantially vertically upward from said stylus.

3. The phonograph cartridge as claimed in claim 1 wherein the stylus is at the focus of said magnifying lens when said protective member is in either of its said first and said second positions.

4. The stylus protector as claimed in claim 1, wherein said protective member is constructed of a clear plastic material.

5. The phonograph cartridge as claimed in claim 1, wherein said protecting member is generally U-shaped having a base and two arms extending from said base, said member being pivotally mounted to said cartridge at the ends of said arms.

6. The phonograph cartridge as claimed in claim 5, wherein said lens is located on said base of said U-shaped protective member.

7. The stylus protector as claimed in claim 1, wherein said magnifying lens is integrally molded with said protective member.

* * * * *